(12) United States Patent
Flowerdew et al.

(10) Patent No.: US 7,211,986 B1
(45) Date of Patent: May 1, 2007

(54) INDUCTIVE CHARGING SYSTEM

(75) Inventors: Peter M. Flowerdew, Brentry (GB); David Huddart, Westbury-on-Trym (GB)

(73) Assignee: Plantronics, Inc., Santa Cruz, CA (US)

( * ) Notice: Subject to any disclaimer, the term of this patent is extended or adjusted under 35 U.S.C. 154(b) by 106 days.

(21) Appl. No.: 10/882,961

(22) Filed: Jul. 1, 2004

(51) Int. Cl.
*H02J 7/00* (2006.01)

(52) U.S. Cl. ...................................... 320/108
(58) Field of Classification Search ................ 320/107, 320/108, 110, 112, 113, 114, 115, 116
See application file for complete search history.

(56) References Cited

U.S. PATENT DOCUMENTS

| | | | |
|---|---|---|---|
| 3,840,795 A | 10/1974 | Roszyk et al. | |
| 3,938,018 A * | 2/1976 | Dahl | 320/140 |
| 4,873,677 A * | 10/1989 | Sakamoto et al. | 368/204 |
| 5,110,793 A * | 5/1992 | De | 320/108 |
| 5,396,538 A * | 3/1995 | Hong | 455/573 |
| 5,479,486 A * | 12/1995 | Saji | 455/573 |
| 5,522,712 A * | 6/1996 | Winn | 417/436 |
| 5,563,776 A * | 10/1996 | Eck | 363/26 |
| 5,600,225 A | 2/1997 | Goto | |
| 5,734,254 A * | 3/1998 | Stephens | 320/106 |
| 6,134,420 A * | 10/2000 | Flowerdew et al. | 455/41.1 |
| 6,549,379 B1 * | 4/2003 | Kazmierczak et al. | 360/264.8 |
| 6,774,603 B2 * | 8/2004 | Liao | 320/107 |
| 6,798,173 B2 * | 9/2004 | Hsu | 320/134 |
| 6,803,744 B1 * | 10/2004 | Sabo | 320/108 |
| 2004/0145342 A1 * | 7/2004 | Lyon | 320/108 |

* cited by examiner

*Primary Examiner*—Karl Easthom
*Assistant Examiner*—Samuel Berhanu
(74) *Attorney, Agent, or Firm*—Thomas Chuang

(57) ABSTRACT

An apparatus for inductive charging a battery. The apparatus includes a housing with a lower surface and a charging surface. A rechargeable device with a rechargeable battery may be placed on the charging surface. The apparatus further includes a controller for driving an oscillator, wherein the controller receives power from a power source. A first charger coil and second charger coil are disposed within the housing and are coupled to the oscillator. The first charger coil and second charger coil create a substantially horizontal magnetic field in the volume of space above the charging surface.

52 Claims, 12 Drawing Sheets

INDUCTIVE CHARGING SYSTEM

TECHNICAL FIELD

The present invention relates to the general field of charging interfaces. More specifically the invention relates to inductive battery chargers.

BACKGROUND

Wireless headsets and other portable communications devices are often battery powered such that a user can use the wireless headset or other such device without being directly connected to larger power source such as an a/c outlet or automobile battery. This allows wireless headset users flexibility and convenience to move about without being tied to a power cord. Wireless headset batteries are generally rechargeable so that the batteries can be recharged and need not be discarded after use.

Recharging of device batteries has generally achieved by a wired connection. In the prior art, devices employing rechargeable batteries typically have charging contacts so that charging current power can be supplied to recharge the batteries without removing the batteries from the device. In one typical setup, the portable device is inserted into a base charger which has spring loaded contacts that correspond to and couple with the contacts on the portable device. For example, such a setup is used with remote handset phones used in the home. The base charger is connected to a power source, and supplies charging current through the coupled contacts to recharge the batteries located within the device. Spring-loaded surface wiping contacts are generally used with charging bases. This is a convenience feature as users can simply drop the portable device into a cradle without fumbling with a plug. Surface contacts can be placed on the side of a taper form headset or other portable rechargeable device, making docking into a cradle much easier than a plug.

However, use of surface contacts and a charging base station with a headset presents problems due to the smaller physical size and design of headsets. Exposed metal contacts on headsets also risk contamination by oils and moisture from the skin of the wearer. This may cause corrosion and hence poor contact with the base station. Contamination also may cause an electrical leakage path that may cause power loss from the battery and electrolytic activity. Exposed metal contacts may also result in an allergic reaction to the user if in prolonged contact with the user's skin. During the rechargeable device docking process, the formed ends of the base station charging contacts often come into contact with the plastic housing of the rechargeable device and can scratch the housing and pick up contamination which can cause intermittent electrical contact. One potential solution is to cut the rechargeable device housing away to fully expose the rechargeable device stationary contacts so that the spring loaded contacts of the base station never touched the plastic housing during docking. However, this solution may compromise the rechargeable device industrial design, aesthetics, and possibly weaken the rechargeable device structural integrity.

Furthermore, the headset or other rechargeable device may not be firmly detented with the charging base, which may also cause intermittent electrical contact. One potential solution to the weak coupling between the portable rechargeable device and charging base to dish the stationary contacts in the rechargeable device so that the rechargeable device detents when the ends of the spring loaded base station contacts press into the depressions in the rechargeable device contacts. However, this solution compromises the industrial design of the rechargeable device, and in addition the detent force is less than robust.

As electronic items become smaller and the regulatory requirements become more stringent, the charging port becomes more noticeable as a relatively large unattractive feature of the housing, as an ESD weakness, as a relatively unreliable element in the system.

In the prior art, contactless battery chargers have also been utilized. The use of inductive coupling used for contactless power transfer between electrical items is described in the prior art. The magnetic field generated by one coil is made to couple closely with that of a second coil. Changes in the field induce a voltage in the second coil hence power transfer is possible. Inductive charging is discussed in U.S. Pat. No. 3,840,795, Electric Toothbrush, U.S. Pat. No. 3,938,018, Charger for electronic items, U.S. Pat. No. 4,873,677, Rechargeable watch. Basic inductive charging components are available from companies such as Panasonic and TDK.

FIG. 1 illustrates a typical prior art arrangement to ensure close coupling as disclosed in U.S. Pat. No. 5,600,225. In this arrangement, mechanical coupling between the charger and radiotelephone is required. The charger 1 for supplying power for charging to the radiotelephone is installed within a base case 101. A depression 102 into which the radiotelephone may be inserted is provided on the upper surface of the base case 101, and a primary coil 103 is provided in the base case 101 for producing magnetic flux which runs around the side walls of the depression 102 in a vertical plane. This primary coil 103 is connected to an oscillating circuit for supplying alternating current to the coil.

The radiotelephone 2 is provided with a microphone 202, a console keyboard 203, a display 204, a receiver 205, and an antenna 206 mounted on a slender telephone case 201. Inside the telephone case 201 is a storage battery. The storage battery is connected to a secondary coil 212 by way of an AC-DC conversion circuit.

The base of the telephone case 201 is constructed to allow insertion into the depression 102 provided in the base case 101, and in this way the radiotelephone 2 may be placed on the charger 1 in an erect state. The secondary coil 212 is provided within the base portion of the case 201 of the radiotelephone 2.

To operate, the radiotelephone 2 is placed upon the charger 1 when the storage battery is to be charged. At this time, the radiotelephone 2 is held in an erect state by means of insertion of the base portion of the telephone case 201 of the radiotelephone 2 into the depression 102 provided in the base case 101 of the charger 1. An alternating current signal of prescribed frequency generated in this oscillating circuit is supplied to the primary coil 103. As a result, an alternating magnetic field is generated by the primary coil 103 within the depression 102 in the base case 101 of the charger 1. This alternating magnetic field generates an induced electromotive force in the secondary coil 212 arranged in the base portion of the telephone case 201 of the radiotelephone 2.

The prior art device described in reference FIG. 1 as well as other prior art solutions require mechanical coupling between the charger and device to be charged. To make the efficiency of power transfer as high as possible it is necessary to contain the magnetic field so that all, or most, of the field in the first coil is linked to the second. To achieve this it is typically necessary to provide some close mechanical coupling such that there is a form of "plug" and "receptacle" arrangement. Contactless charging has been restricted to 'mating pairs' in that the item to be charged and the charger are designed as a pair to achieve a closely controlled mechanical alignment of the coils in each unit, to maximize efficiency. This means that generally these charging methods are custom designed for the appliance due to non standardization of the interface and can require dexterity to use. The costs of the design of the charging system and the additional mechanical design have to be born by the individual product. This has restricted the adoption of contactless charging systems. Removing the requirement for accurate mechanical alignment would allow one charger design to be used across a range of products, allowing the development costs to be born by the range of products and reducing the design time for the introduction of a new product Furthermore, prior art solutions often allow charging of only one item at a time. Generally, a user has multiple rechargeable devices which require charging power. As a result, the user must transport or use a number of chargers, generally one for each item. As the number of devices used by an individual increases, the multiplicity of chargers becomes problematic.

Thus, improved charging interfaces between charging base stations and rechargeable devices are needed.

SUMMARY OF THE INVENTION

The present invention provides a solution to the needs described above through an inventive inductive battery charger.

The present invention provides an apparatus for inductive charging a battery. The apparatus includes a housing with a lower surface and a charging surface. A rechargeable device with a rechargeable battery may be placed on the charging surface. The apparatus further includes a controller for driving an oscillator, wherein the controller receives power from a power source. A first charger coil and second charger coil are disposed within the housing and are coupled to the oscillator. The first charger coil and second charger coil create a substantially horizontal magnetic field in the volume of space above the charging surface.

The present invention further provides a system for inductive charging which includes a charger. The charger includes a housing with a lower surface and a charging surface. A rechargeable device with a rechargeable battery may be placed on the charging surface. The charger further includes a controller for driving an oscillator, wherein the controller receives power from a power source. A first charger coil and second charger coil are disposed within the housing and are coupled to the oscillator. The first charger coil and second charger coil create a substantially horizontal magnetic field in the volume of space above the charging surface. The rechargeable device includes a receive coil for coupling to the horizontal magnetic field and producing an induced voltage. The rechargeable device further includes a rectifier for producing a rectified induced voltage to charge the battery in the rechargeable device.

DESCRIPTION OF THE DRAWINGS

The features and advantages of the apparatus and method of the present invention will be apparent from the following description in which.

DETAILED DESCRIPTION OF THE PREFERRED EMBODIMENTS

The present invention provides a solution to the needs described above through an inventive inductive battery charger.

Other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

The present invention provides a contactless charging system utilizing induction which does not require a housing with a compartment or recess that must be mechanically matched to the item being charged. This creates the opportunity to charge a variety of battery powered electronic items from a single charger. Further, the charging system lends itself to the simultaneous charging of dissimilar items.

In an embodiment of the invention, the charger takes the form of a shallow concave (herein also referred to as "dished" or a "dish") or similarly shaped upper charging surface, which whilst substantially flat and thin, develops a magnetic field which is substantially horizontal rather than perpendicular to its surface, which is typically the case if a coil were wound in the same plane as a plate. By developing an angled field that is substantially horizontal, it is possible to couple energy to a receiver coil comprising a long solenoid, lying horizontally on the upper surface of the charger.

Figure 1:
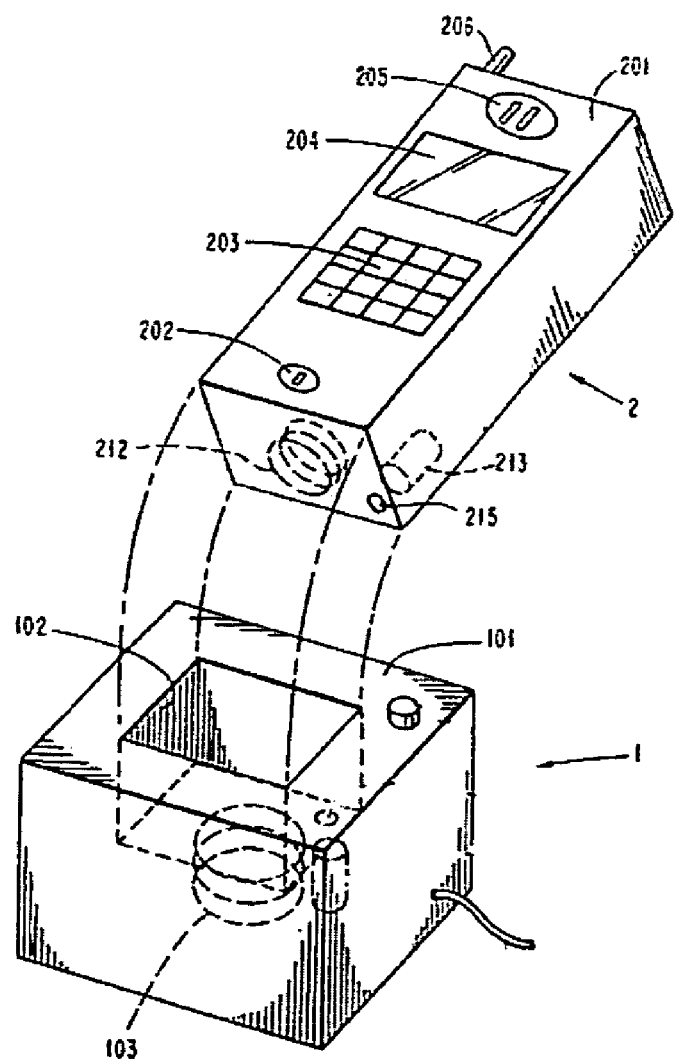
FIG. 1 is an illustration of a prior art induction charging system
Figure 2:
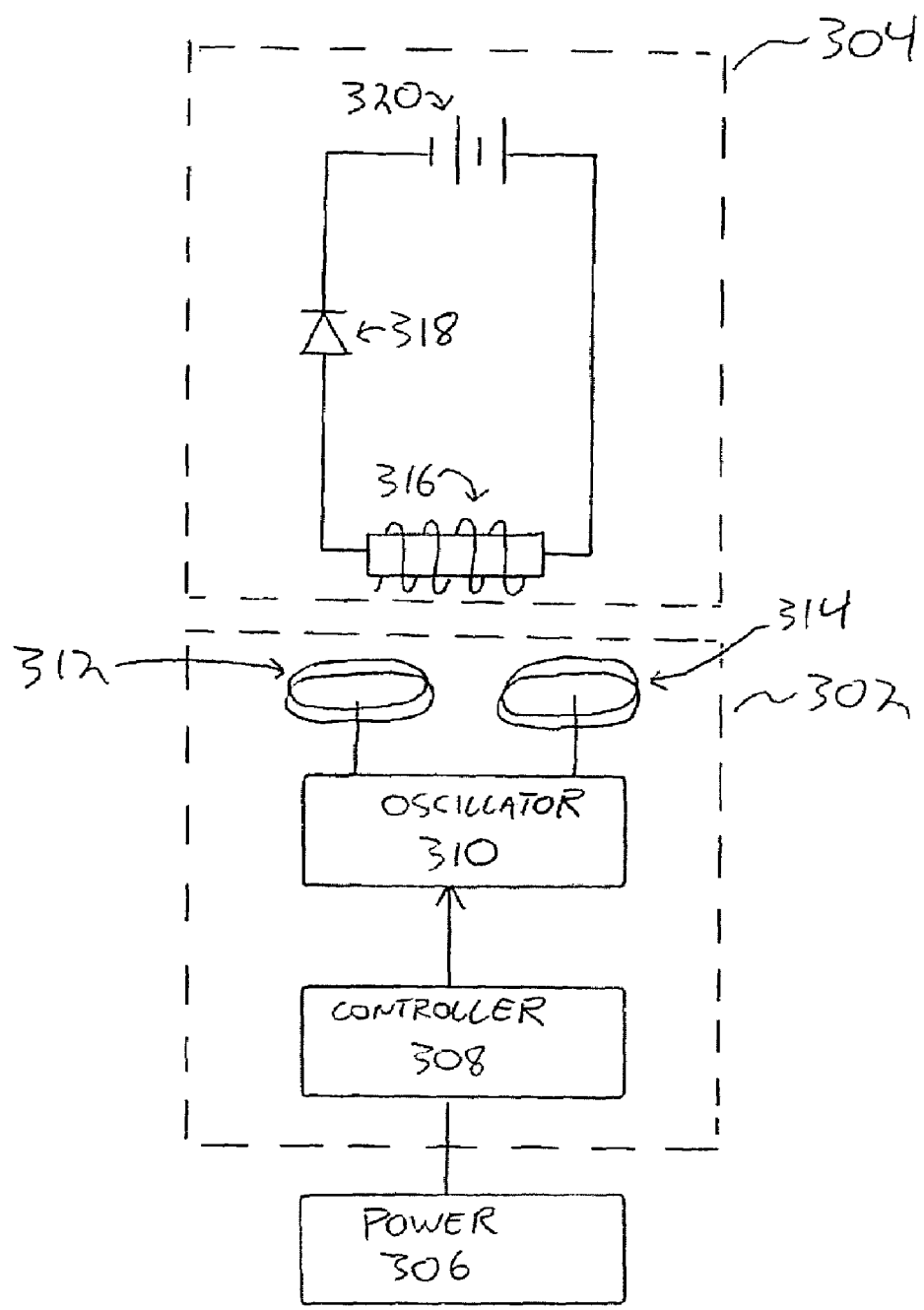
FIG. 2 is a circuit diagram partly in block form of a charging system in accordance with an embodiment of the invention.

Referring to FIG. 2, a circuit diagram partly in block form of a charging system including a charger 302 (also referred to herein as a primary unit or base unit) and secondary unit 304 (also referred to herein as a device to be charged or unit under charge) are shown. Circuit diagram elements are mounted on a printed circuit board disposed within charger 302 and secondary unit 304. Secondary unit 304 includes a rechargeable battery 320 to be charged by charger 302.

Secondary unit 304 may be any small electronic device with a battery to be recharged. For example, secondary unit 304 may include wireless headsets, mobile telephones, personal digital assistants (PDAs), cameras, or other such devices.

Charger 302 is designed to draw power from a power source 306 such as a standard electrical wall outlet. In a further embodiment power source 306 may be an auxiliary power source from another piece of electronic equipment, such as through a USB port on a personal computer. Charger 302 may be linked to the personal computer via the USB port to provide data derived from communication with one or more secondary units 304 to the computer for display. Where secondary unit 304 is a small item such as a wireless headset or cordless mouse, an auxiliary power source can provide sufficient charging power.

Referring to FIG. 2, there is shown power source 306 connected to a controller 308 for driving an oscillator 310. Controller 308 may include a rectifier. Oscillator 310 provides a high frequency A.C. signal to drive a charger coil. The frequency of the A.C. signal may vary. The lower limit for a practical operating frequency is determined by the higher field strength and/or larger coils required in the primary and secondary units. A higher frequency desirably facilitates the use of a smaller coil in the unit being charged. The upper limit on a practical operating frequency is determined by either the energy dissipated in the metallic content of the unit being charged, primarily the copper layers of a PCB, or by reaching the self-resonant frequency of any of the coils. These limits are therefore defined in practice by the volumes available for the coils, the power that must be transferred, the allowable internal temperature of the unit being charged and the efficiency required in the system. The frequency representing the best compromise between these different criteria is approximately in the range from 8 kHz to 300 kHz. In an embodiment of the invention, the preferred operating range is between 10 kHz and 40 kHz. The high frequency signal may be raised or lower depending upon the specific application. A charger coil (also referred to herein as a drive coil) takes the form in the particular embodiment illustrated of charging coil 312 and charging coil 314 connected to oscillator 310. As described in further detail below, charging coil 312 and charging coil 314 are disposed at an angle to each other to direct the path of the generated electromagnetic field in a desired manner to enable horizontal coupling.

Shown in proximity to charger 302 is secondary unit 304. Secondary unit 304 includes a secondary unit coil 316 (also referred to herein as a receive coil), which may include a permeable material core. During charging, secondary unit 304 is placed near charger 302 so that the magnetic flux from the magnetic field created by charging coil 312 and charging coil 314 passes through the secondary unit coil 316. The positioning of secondary unit coil 316 is such as to provide for maximum flux coupling of the electromagnetic field provided from the angular arrangement of the charging coil 312 and charging coil 314. Consequently, the magnetic flux induces a voltage across coil 316 resulting in an induced current to charge battery 320. A meter may be connected across the secondary unit coil 316 to provide a visual indication of the degree of coupling.

Within secondary unit 304, the secondary unit coil 316 connects to a rectifier which serves as an A.C. to D.C. converter. Although illustrated as a rectifying diode 318, the rectifier may be implemented by other means. For example, a custom ASIC providing synchronous rectification to minimize voltage drops may be used. Rectifying diode 318 provides a D.C. charging signal to battery 320, which is connected in series between secondary unit coil 316 and rectifying diode 318. Battery 320 serves as a power source for secondary unit 304. Charging is accomplished with a constant current. A regulator circuit may be employed to charge battery 320 to a certain capacity and then convert the charging current to a trickle type charge. The regulator circuit is responsive to the temperature and voltage of battery 320 to limit the charging current. The description of charger 302 and secondary unit 304 has been described in reference to the simplified circuit diagram shown in FIG. 2 for clarity. Other circuit elements and arrangements may be utilized by charger 302 in order to provide alternating current flow to charging coil 312 and charging coil 314.

Figure 3A:
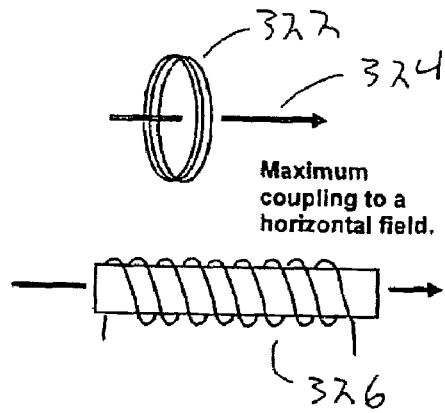
FIGS. 3A, 3B, and 3C are an illustration of horizontal coupling between a pancake coil and solenoidal coil.
Figure 3B:
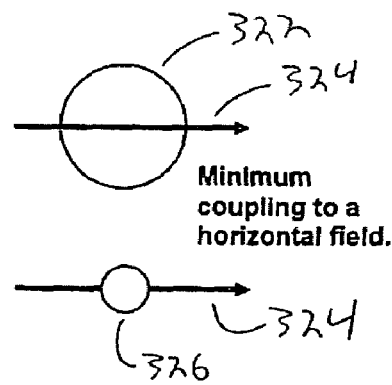
Figure 3C:
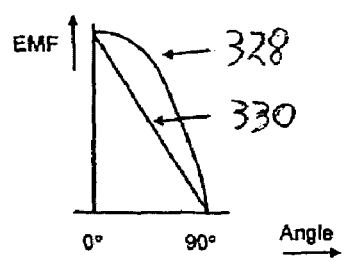

One feature of the invention is a charger 302 which generates an essentially horizontal magnetic field and the use of a long solenoidal coil 326 to receive this field. FIGS. 3A, 3B, and 3C are an illustration of horizontal coupling between a pancake coil 322 and solenoidal coil 326. The EMF induced in a coil depends strongly on the angle that it makes to the magnetic field. Referring to FIG. 3A, the maximum possible induction (coupling) occurs when the field passes through the coil. This occurs when the direction of the field is orthogonal to the plane of the coil. Illustrated in FIG. 3A is maximum induction for a pancake coil 322 and a solenoidal coil 322 from a horizontal field 324. This arrangement forms the basic geometry of a charger 302 utilizing a horizontal field.

Referring to FIG. 3B, if the pancake coil 322 or solenoidal coil 322 is rotated by 90° around a vertical axis, there is no flux through the coil, and no induced EMF. With a pancake coil 322 the decrease from full coupling to zero coupling follows a sinusoidal curve. The change in coupling for a cored solenoidal coil 326 is less well defined but tends to be more linear. A 30° rotation from maximum coupling results in approximately 14% reduction in induced EMF for a short coil and 30% reduction in the output of a winding on a long thin core. Referring to FIG. 3C, the induced voltage as a function of angle to the field for a pancake coil 328 and long solenoid coil 330 is shown.

Figure 4A:
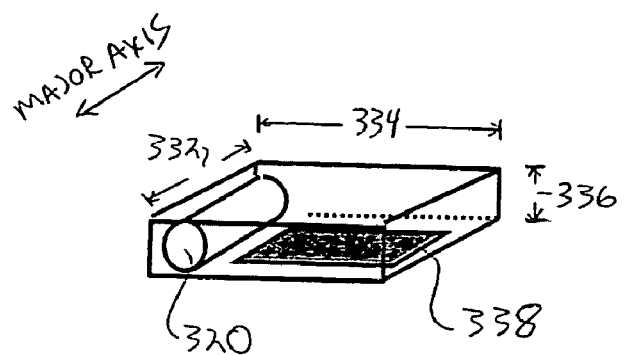
FIGS. 4A, 4B, and 4C are an illustration of a potential configuration of the components of a secondary unit containing a battery to be recharged.
Figure 4B:
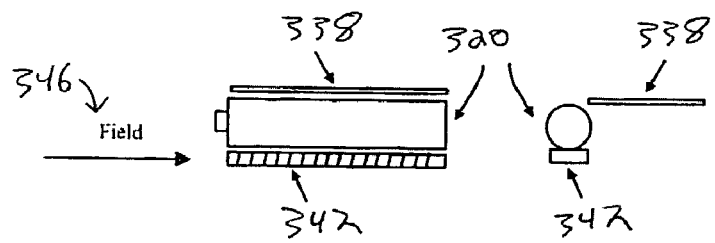
Figure 4C:
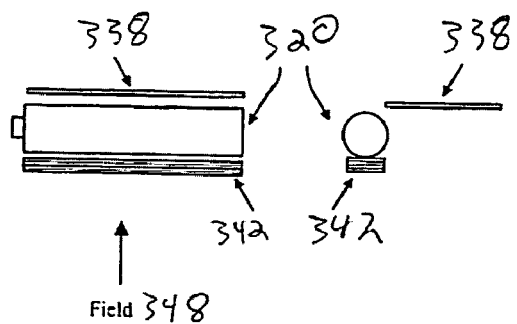

FIGS. 4A, 4B, and 4C are an illustration of a potential configuration of the components of a secondary unit containing a battery to be recharged. The configuration is advantageously arranged to allow for easy placement of the secondary unit on charger 302 while still providing for the desired horizontal field coupling.

Referring to FIG. 4A, hand held secondary units having a housing 340 with length 334, width 332 and thickness 336 would normally be placed on a flat surface, such as a desk, with the dimension indicated as thickness 336 in the vertical plane. For ergonomic reasons it is usual to arrange a battery 320 in such a secondary unit such that the battery major axis is in the horizontal plane and a PCB 338 carrying the electronic circuits would also generally be in the horizontal plane. The inventive system advantageously utilizes a coil wound on a long, thin permeable core (a solenoidal winding) as the inductive element to receive energy from a horizontal field in the secondary unit being charged. Use of a solenoidal winding is possible because the charger generates a substantially horizontal field. With some shapes of housing there may be advantage to rotating the coil in the horizontal plane and/or translating it vertically.

FIG. 4B illustrates the geometry associated with charging with a singular direction horizontal field 346 whilst FIG. 4C illustrates the implications of using a singular direction vertical field 348. Coil windings are placed under the battery in an embodiment of the invention. Referring to FIG. 4B, when charging is conducted with a horizontal field 346, a solenoidal winding on a high permeability core 342 may be utilized. The use of a high permeability core advantageously allows a high induced voltage in the solenoidal coil. The effective permeability of a magnetic core is a direct function of the ratio of its length to its diameter, so a long thin core couples more effectively to a field than a short flat one. Also advantageously, battery 320 and PCB 338 are in a separate magnetic flux path, thereby minimizing the effect on the coil Q. However, in a singular direction horizontal field 346, a rotation of solenoidal winding on permeable core 342 in the horizontal plane will produce a coupling null.

Referring to FIG. 4C, when charging is conducted with a singular direction vertical field 348, a low permeability core is utilized resulting disadvantageously in a low induced voltage. Furthermore, battery 320 and PCB 338 are in the same magnetic flux path, producing the potential for high loss. Advantageously, when a vertical field 348 is used, there is no coupling null with rotation of the coil in the horizontal plane.

Neither the singular direction vertical field 348 nor the singular direction horizontal field 346 delivers the ideal set of characteristics. However, since efficient coupling is the most important requirement in a charger, a horizontal field is preferred. Furthermore, as described below, charger 302 generates a horizontal field and advantageously is designed with a rotating horizontal field so that a coupling null does not result with horizontal rotation of the secondary unit. The charging system of the present invention advantageously provides for a high permeability core so high induced voltage in charging coil, no null with rotation in the horizontal plane, and a battery and PCB in a separate flux path so there is a low effect on coil Q.

Figure 5:
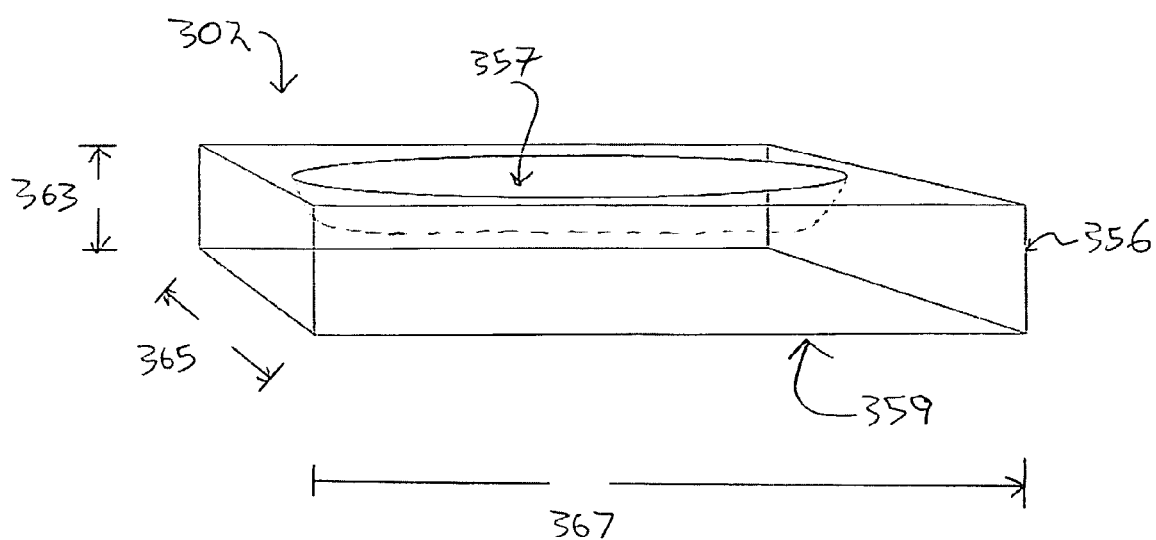
FIG. 5 illustrates a perspective view of an embodiment of the charging device of the present invention.
Figure 7:
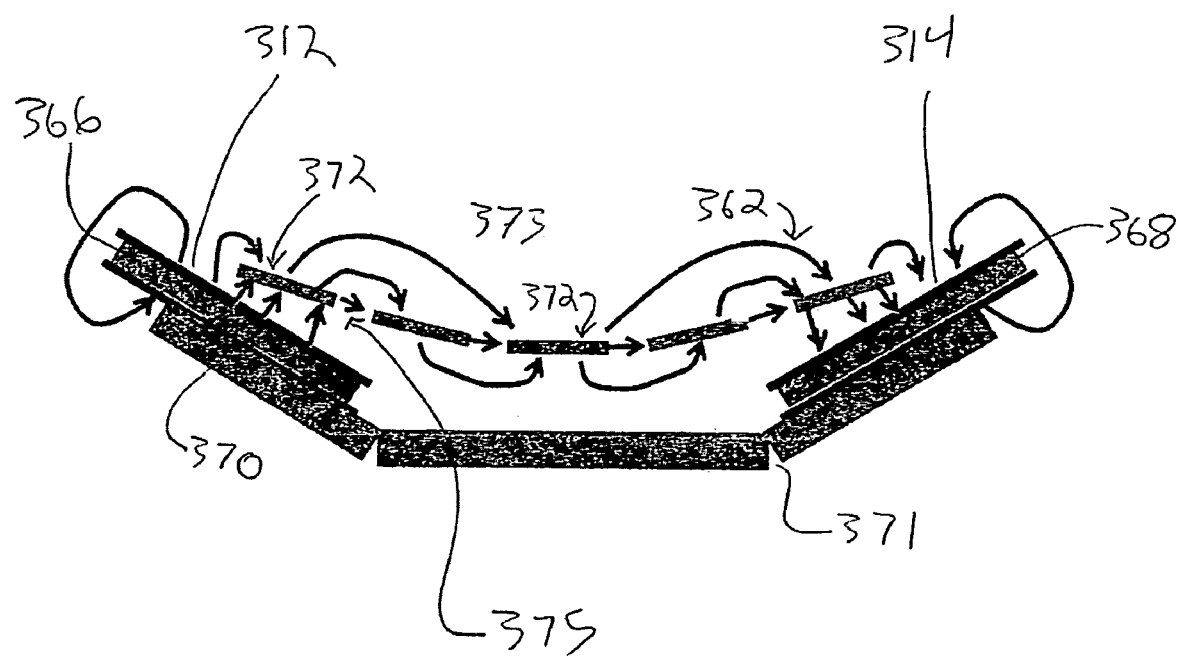
FIG. 7 is a diagrammic view of a further embodiment of the charger.

FIG. 5 is a perspective view of charger 302 showing a housing 356 with a lower surface 359 and a charging surface 357 on which secondary units are placed for charging. Although illustrated in a block housing in FIG. 5, lower surface 359 and charging surface 357 may be incorporated into a variety of housing shapes, including a configuration with raised sides as illustrated in FIG. 7. Lower surface 359 is designed to act as a base when the unit is placed on a horizontal surface. Charging surface 357 is designed to receive items which will receive power from charger 302. In an embodiment of the invention, charging surface 357 is a shallow concave surface in the vertical dimension 363. Charging surface 357 is concave along the length dimension 367 and along the width dimension 365, forming a dish or bowl like structure with a base surface parallel to the lower surface 359. The depth of the dish is smaller than the dimensions of length dimension 359 or width dimension 365. In further embodiments, charging surface 357 is concave in only the length dimension 367 or width dimension 365 or flat. Charging surface 357 may include a plurality of dished recesses to permit the secure and defined location of a plurality of items placed on the surface. The dished recesses may be optimized for the alignment of some subset of items that are placed on the surface to receive power from charger 302. In a further embodiment of the invention, charging surface 357 possesses one or more markers indicating a preferred alignment and/or orientation for items that may placed on that part of the surface to receive power from charger 302.

Figure 6:
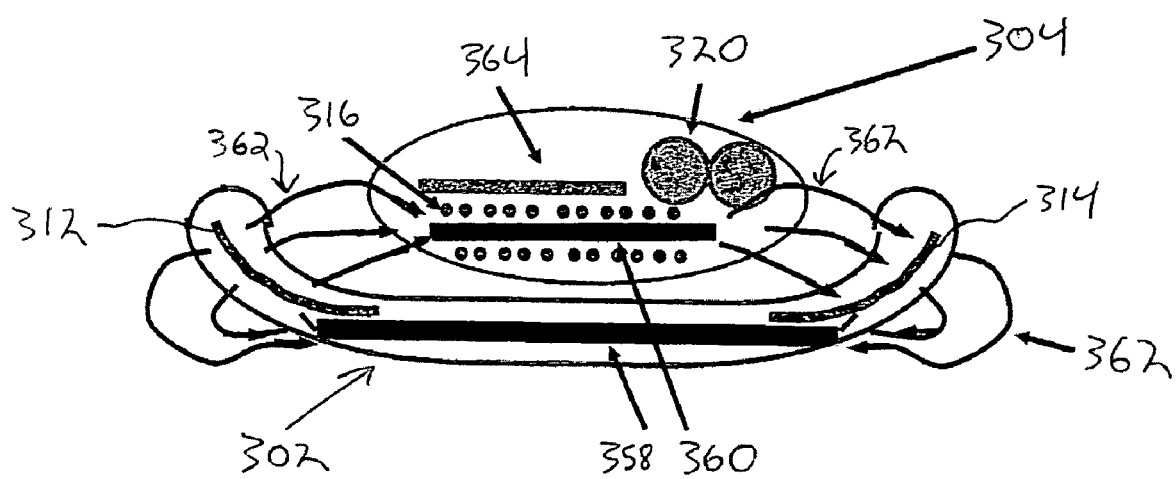
FIG. 6 is a diagrammic view of the charger and the secondary unit.

A feature of the invention is the provision of a shaped electromagnetic field to optimize coupling between charger 302 and secondary unit 304. As shown in FIG. 6, in an embodiment of the invention, a horizontal field is generated using angled paired coils embodied in charging coil 312 and charging coil 314. By utilizing a concave surface in the vertical dimension, discrete charging coils 312 and 314 may be positioned adjacent to the concave surface at varying inward angles with respect to a vertical axis to generate the desired horizontal field. Raising and angling charging coil 312 and charging coil 314 places the coil center-lines closer to the axis of the solenoid, thereby providing for improved coupling.

FIG. 6 is a diagrammic view of a charger 302 and secondary unit 304. FIG. 6 illustrates an exemplary physical arrangement of a charger 302 of the inductive charging system. Charger 302 includes a housing structure 356 defining a charging surface 357 advantageously shaped to receive a secondary unit 304 incorporating a rechargeable battery 320. Controller 308 and oscillator 310 described in reference to FIG. 2 are disposed within housing structure 356 (not shown).

Charger 302 may also contain additional components typical of battery charging devices. For example, charger 302 may always be in a power on status, or alternatively may include a manually operated on/off button for turning the charger power on and off. Charger 302 may also include an indicator light such as a light emitting diode which serves as an indictor of the power status. Secondary unit 304 may also include an indicator light coupled to a secondary unit 304 control circuit which indicates charging status.

To operate, the secondary unit 304 is placed upon charger 302 when the battery 320 in secondary unit 304 is in need of charging. The secondary unit 304 is placed on charging surface 357 provided on charger 302. Charger 302 is then connected by way of a power cord to an external power source 306. When charger 302 is in a power on state, power controlled by controller 308 is supplied to oscillator 310. An alternating current signal of prescribed frequency generated in oscillator 310 is supplied to charging coil 312 and charging coil 314. As a result, an alternating magnetic field is generated by charging coil 312 and charging coil 314 above charging surface 357 of charger 302.

The alternating magnetic field generates an induced electromotive force in the secondary unit coil 316 arranged in the secondary unit 304. The alternating current arising from this induced electromotive force is converted to direct current in an AC-DC conversion circuit including rectifying diode 318. The direct current power outputted from the AC-DC conversion circuit constitutes a DC power source which may be applied to the battery 320 directly or, more usually, through a charge control circuit, so causing the battery to be charged. As a result, battery 320 built into the secondary unit 304 is charged without being electrically connected to charger 302, i.e., while in an electrically contactless state. The charger power may be turned off to interrupt the magnetic circuit so that the secondary unit 304 may be easily removed from charger 302 when the charging is complete or when use of secondary unit 304 is desired. The arrangement is such that when secondary unit 304 is placed on charging surface 357, the coil 316 within secondary unit 304 will be in flux coupling relationship with charging coil 312 and charging coil 314.

Referring to FIG. 6, disposed in the base of housing 356 is a permeable material 358. Permeable material 358 serves several functions. Permeable material 358 increases the flux density in the area where secondary unit 304 is placed on housing 356 and prevents flux from passing to metal structures on which charger 302 is placed and introducing losses, such as a filing cabinet or the metal frame of a bench. Permeable material 358 makes charger 302 less susceptible to other items introduced into the environment, such as cables, keys and other metallic objects. Furthermore, permeable material 358 contains the fields to the volume of space where it is used and reduces the potential for interference with proximate electronic equipment, as well as provides mass for mechanical stability.

In operation, a magnetic flux linkage 362 propagates along a flux path between the coils in charger 302 and secondary unit 304. The use of a horizontal field minimizes the cross-sectional area of metal in the PCB and batteries exposed to the magnetic fields, thereby minimizing the energy losses associated with eddy currents induced in the items. One or more secondary units 304 receives power from charger 302. The secondary unit 304 including at least one coil 316 designed to couple to the magnetic field generated by charger 302 and thereby have a voltage induced in it. The induced voltage is rectified and used to augment the battery 320 of the secondary unit 304.

Charging coil 312 and charging coil 314 are physically distinct and electrically connected in series, providing a magnetic field with a substantial horizontal component through a substantial percentage of the volume that may be occupied by a secondary unit 304 placed on charging surface 357 to receive power from charger 302. Charging coil 312 and charging coil 314 are thin air-cored coils (also referred to herein as a "pancake" coil or winding) or formed on non-permeable material. In a further embodiment of the invention, charging coil 312 and charging coil 314 contain a core of permeable material.

Charging coil 312 and charging coil 314 operate in a manner similar to Helmholtz coils to generate a substantially horizontal field in the volume of space between charging coil 312 and charging coil 314. In a further embodiment, the charging coil may be operated as Rubens coils. Each coil individually, lying on a horizontal surface produces a magnetic field with an essentially vertical orientation across most of the area bounded by the coil. Used in conjunction, charging coil 312 and charging coil 314 create a horizontal field in a volume of space between the coils. The paired coils produce an open structure.

The charger coils 312 and 314 may be considered as a derivative of the Helmholtz coil arrangement, whereby two circular coils of radius 'a' placed coaxially and in parallel planes produce a substantially uniform field in the space between them, given by the formula:

$$H = \mu_0 \frac{8}{\sqrt{125}} \frac{NI}{a}$$

Coil radius=a
Coil separation=a

If the coils in a Helmholtz system are made rectangular, the field at the centre maintains this property of near uniform strength. If the separation distance is increased slightly the uniformity is lost, but the vector orientation is maintained. If the coils are angled, as shown in the embodiment illustrated in FIG. 6, the field still remains essentially horizontal. In the limit, the coils could be horizontal.

FIG. 7 is a diagrammic view of a further embodiment of charger 302. One or more pieces of permeable material 370, such as ferrite, are used to create a low reluctance path across the bottom of charger 302. The lower level pieces of permeable material 370 are disposed in a volume lying between the surface containing the charging coil 312 and charging coil 314 and the lower surface of the charger housing 356. Permeable material 370 may be overmoulded with a thermoplastic material. Alternatively, permeable material 370 is a non-permeable carrier material loaded with permeable material, such as a ferrite loaded thermoplastic. The ferrite loaded thermoplastic could advantageously be utilized to create the shaped structure to hold the windings of charging coil 312 and charging coil 314 and provide a base for the charger housing.

Small air gaps 371 have little effect on the performance because the reluctance of the path is dominated by the air gap 373 between the two inward facing poles of the windings of charging coil 312 and charging coil 314. Flexible permeable tape, similar to that used for EMC shielding, might also be used to provide curved permeable paths for flux. Charging coil 312 and charging coil 314 may include permeable cores integrated with a permeable material.

The low reluctance path created by permeable material 370 underneath the charging coil 312 and charging coil 314 windings enhances the flux density on charging surface 357. It also controls back flux emission, the flux emanating from the bottom surface of charger 302. Without the low reluctance path, there are significant eddy current losses if charger 302 is placed on a metal desk or filing cabinet.

Field leakage from charging surface 357 is controlled by use of a permeable path 375 formed with an upper layer of permeable tiles 372 on or just below charging surface 357. The upper layer of permeable tiles are disposed in a volume lying between the surface containing charging coil 312 and charging coil 314 and charging surface 357. Permeable tiles 372 may consist of one or more pieces of ferrite material, a non-permeable carrier material loaded with permeable material, or a permeable material over-moulded with thermoplastic. In an embodiment of the invention, permeable tiles 372 are composed of ferrite loaded thermoplastic.

Figure 8A:
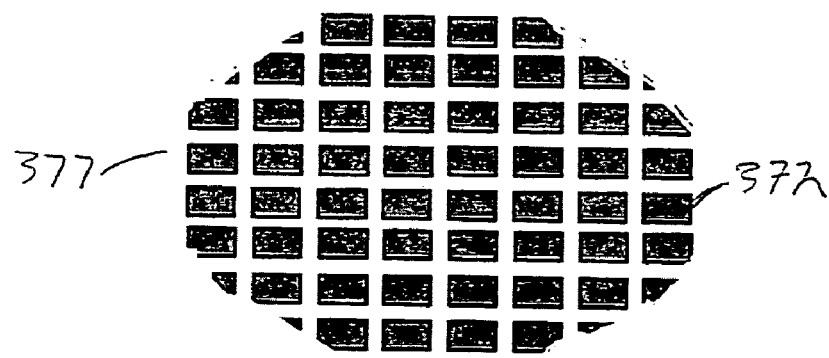
FIGS. 8A, 8B, and 8C illustrate controllable permeability of the housing top surface of the charger.
Figure 8B:
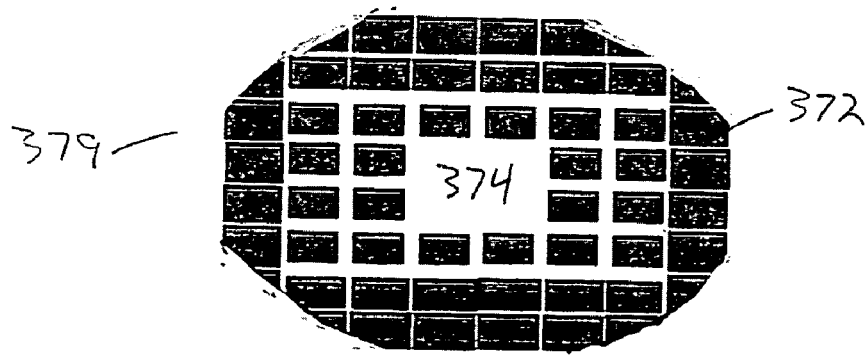
Figure 8C:

FIGS. 8A, 8B, and 8C illustrate embodiments of permeable path 375. Referring to FIG. 8A, a top view of a layout 377 of upper layer permeable tiles 372 in a first embodiment is shown. Layout 377 utilizes a rectangular array of permeable tiles 372. Referring to FIG. 8B, a top view of a layout 379 of upper layer permeable tiles 372 is shown. Layout 377 utilizes a rectangular array of permeable tiles 372 with a tile clearing 374. Referring to FIG. 8C, a tile stacking arrangement 376 cross section layered structure providing variable permeability is shown.

The distribution and/or size of tiles 372 need not be regular. The size and spacing controls the effective permeability of the surface in that region. There is some benefit to having tile clearing 374, in that a greater percentage of the available flux will pass through the core in the secondary unit. Although the layout of tiles 372 in the preferred embodiment is elliptical to conform to the preferred elliptical dished shape of the charging surface, the boundary may be any arbitrary shape.

The permeable path may, by way of practical implementation, be formed by any other means of controlled and/or variable permeability. In a preferred embodiment the surface is formed by a moulded ferrite loaded thermoplastic sheet. The distribution of permeable material need not be uniform. It may be varied to create regions of higher and lower effective permeability. In another preferred embodiment layers of ferrite loaded sheet are stacked such that a larger number of layers is formed at the sides than at the centre and the resulting stack is over-moulded.

The benefits of a permeable charging surface 357 are multi-fold. The permeable charging surface 357 provides containment of the field to avoid interference with proximate electronic equipment. It reduces the effect of proximate metallic objects, even if items such as keys or coins are placed in the charging area of the charger, since there is little or no diversion of the flux from the path provided by the permeable surface. The permeable charging surface 357 provides concentration of flux into the area where a secondary unit will be placed and allows the creation of a plurality of charging zones to allow the simultaneous charging of a plurality of secondary units through allocation to individual zones. Furthermore, the permeable charging surface 357 lowers the change of inductance of the drive coils in the charger when a secondary unit is introduced, since one permeable path is exchanged for another.

Figure 9:
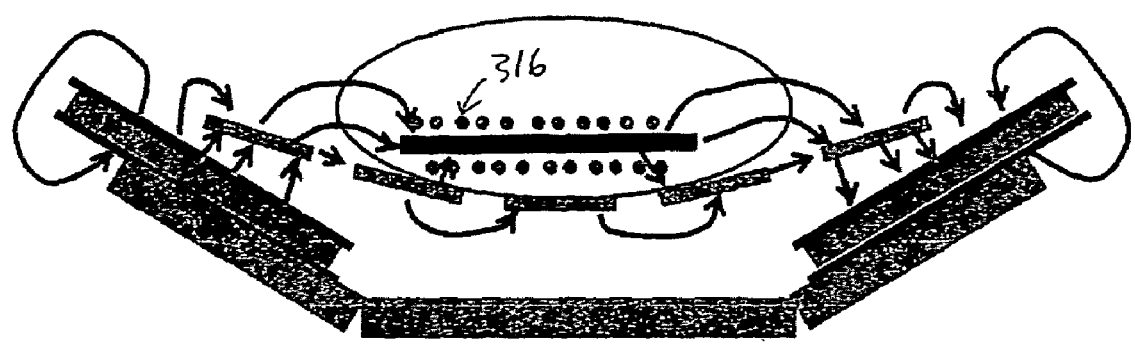
FIG. 9 is a diagrammic view of the charger with a controlled permeability housing top surface and the secondary unit.

FIG. 9 is a diagrammic view of the charger 302 with a controlled permeability charging surface 357 and a secondary unit 304. Charger 302 is that of the embodiment described in reference to FIG. 8. Charger 302 charging surface 357 is composed of a patterned layout of ferrite tiles. The size and shape of the tiles is designed such that, whilst performing the field containment, the placement of a secondary unit 304 provides a lower reluctance path and magnetic flux 362 would be diverted to the coil 316 in the secondary unit 304. As illustrated in FIG. 9, the curvature of charging surface 357 assists the redirection flux through secondary unit 304. However, the curvature is arbitrary and in other embodiments the surface for the secondary unit to be placed on could be flat.

Figure 10:
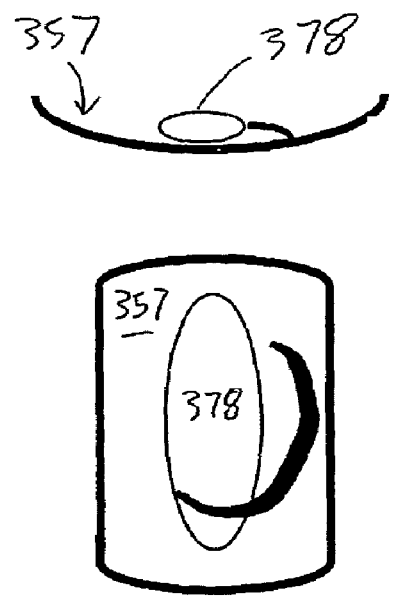
FIG. 10 illustrate placement of the secondary unit on the surface of the charger.
Figure 11:
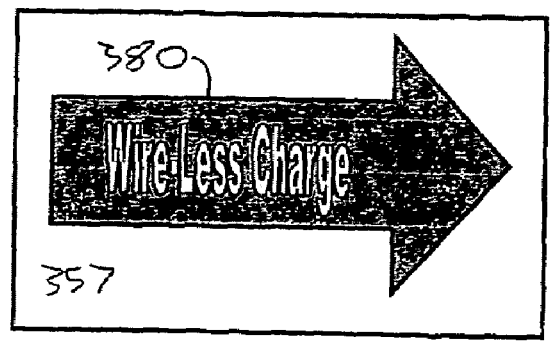
FIG. 11 illustrate the use of a directional logo on the charger.

FIG. 10 illustrate placement of the secondary unit on the surface of charger 302. Charger 302 utilizes a geometrically advantageous charging surface 357. As illustrated in FIG. 10, where charging surface 357 is dished, a secondary unit 304 placed on it tends to align in one axis. This alignment is such that the coupling between a solenoid receive coil in secondary unit 304 and the charging coils of charger 302 is maximized as described in FIG. 3. For this reason the preferred embodiment provides a dished surface. Furthermore, a headset with an ear clip extending from one side placed on the dished surface will tend to create a preferential stable orientation as the earclip rests on the sidewall of the dished surface. FIG. 11 illustrate the use of a directional logo on charger 302. A directional logo 380 placed on charging surface 357 is utilized to indicate a preferred orientation with which secondary unit 304 should be placed on the charging surface 357 such that coupling is maximized and a preferred side to place the secondary unit 304 onto charging surface 357. A corresponding logo may also be placed on the secondary unit 304.

Figure 12A:
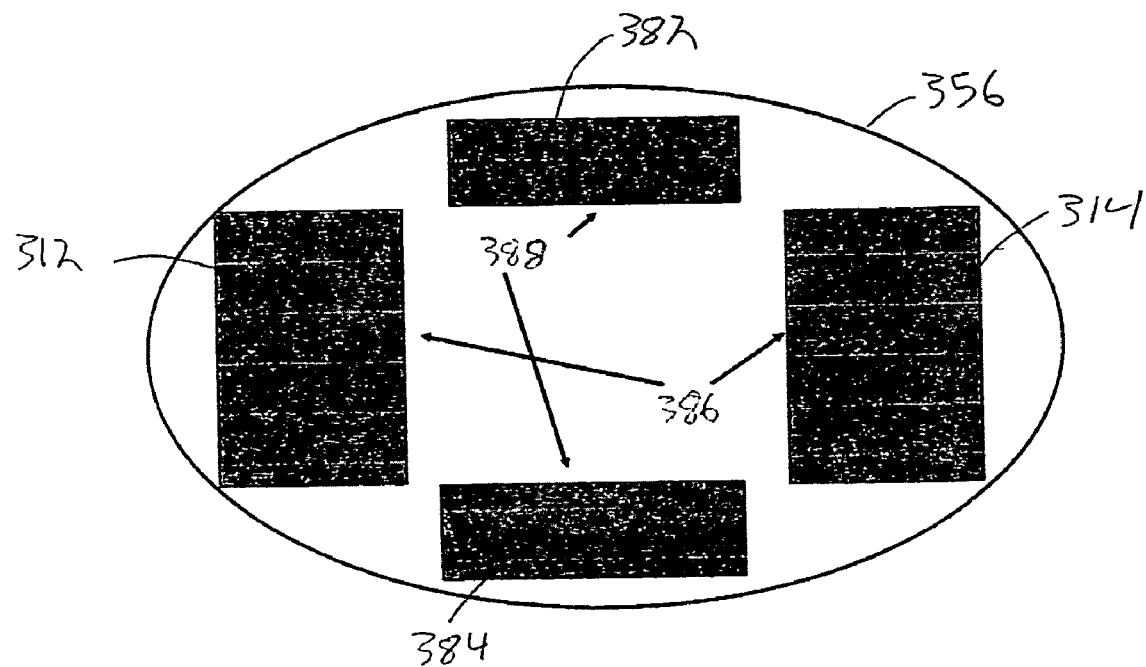
FIGS. 12A and 12B illustrate a charger utilizing a rotating horizontal field.
Figure 12B:
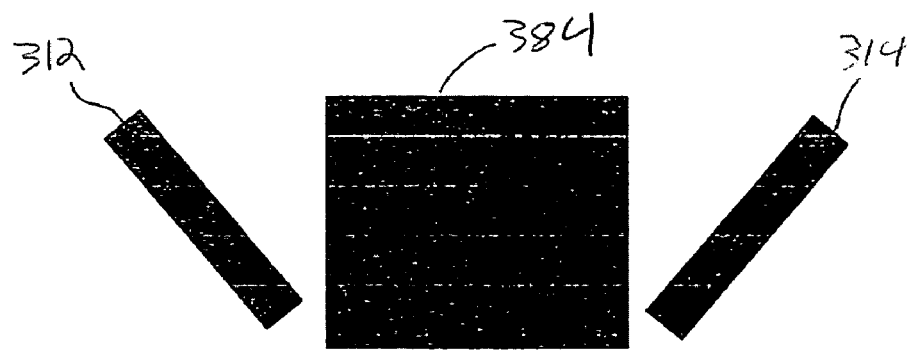

FIGS. 12A is a top view and 12B is a side view of a charger 302 utilizing a rotating horizontal field. As disclosed in U.S. Pat. No. 5,966,641, entitled "Aerial Arrays for Inductive Communications System", which is hereby incorporated by reference, a solenoidal coil placed in the plane of a rotating field will not experience a coupling null. A coil in the plane of a rotating field is always aligned with the field for a period in the cycle. The voltage induced is at the frequency of rotation and there are no positions of zero coupling. The rotating field is produced by providing a second pair of charger coils 388 including a coil 382 and coil 384 in addition to a first pair of charger coils 386 comprising a charging coil 312 and charging coil 314. The second pair of charger coils 388 is positioned orthogonal to first pair of charger coils 386, and the two pairs are driven with voltage waveforms having a 90° phase shift, thereby creating a net field with a rotating horizontal field. Coil 382 and coil 384 are positioned within charger 302 at an angle and depth similar to charging coil 312 and charging coil 314.

First pair of charger coils 386 and second pair of charger coils 388 are electrically connected in series, and are disposed and electrically connected to provide two magnetic fields with a substantial horizontal component through a substantial percentage of the volume that may be occupied by a secondary item placed on the upper surface to receive power from the charger. The horizontal components of these two fields are substantially orthogonal and the fields are created at the same frequency with a nominal 90° phase shift. The shape and distribution of the first and second pair of coils can be varied to suit the ascetics of the product or the requirements of a particular secondary unit. In an embodiment, coils are wound on rectangular cores and distributed so as to produce a dish with an elliptical boundary.

The use of a rotating horizontal field also minimizes the effects of areas of low field strength on charging surface 357 (referred to herein as "shadow zones"). A secondary unit with a large induction coil extracting a large amount of power from the charger may create a shadow zone which prevents an adjacent smaller secondary unit from charging. The effect is minimized by the use of a rotating field, since an incident field orthogonal to a first horizontal field creates a shadow zone at a different location. As a result, a smaller secondary unit is only in a shadow zone periodically.

Two element inductive charging systems typically create a resonance in both the transmitting and the receiving coils for a given frequency. The resonance maximizes the current, and hence the flux density from a given drive voltage, and maximizes the receive voltage for a given intercepted flux. This technique is effective and economic where, as is the usual case, the two elements of a contactless charging system are designed only for use as a matched pair.

The present invention is capable of charging a variety and/or plurality of secondary units. When the number and type of secondary units being charged is variable, the power extracted from the field and the amount of permeable material and its distribution are ill defined and therefore the inductance and loss resistance seen in the resonant system are also ill defined. Changes in the inductance or loss resistance resulting from placement of one ore more secondary units must be compensated for. The inventive system includes a resonance tuning circuit for operating the first charging coil and second charging coil in a resonance circuit with one or more rechargeable devices placed on the charging surface.

The fundamental equation for a resonant system is $$2\pi f = \frac{1}{LC}$$

where f is the resonant frequency

L is the coil inductance

C is the capacitance used to tune the system.

In one embodiment, the resonance tuning circuit includes a variable capacitance which is adjusted when a secondary unit 304 is placed on the charging surface. In a further embodiment, the resonance tuning circuit varies the frequency of the first charging coil and second charging coil when a secondary unit 304 is placed on the charging surface. Either the capacitance used to resonate the circuit is altered to compensate for the changed inductance or the frequency is changed to keep the system resonant.

Figure 13:
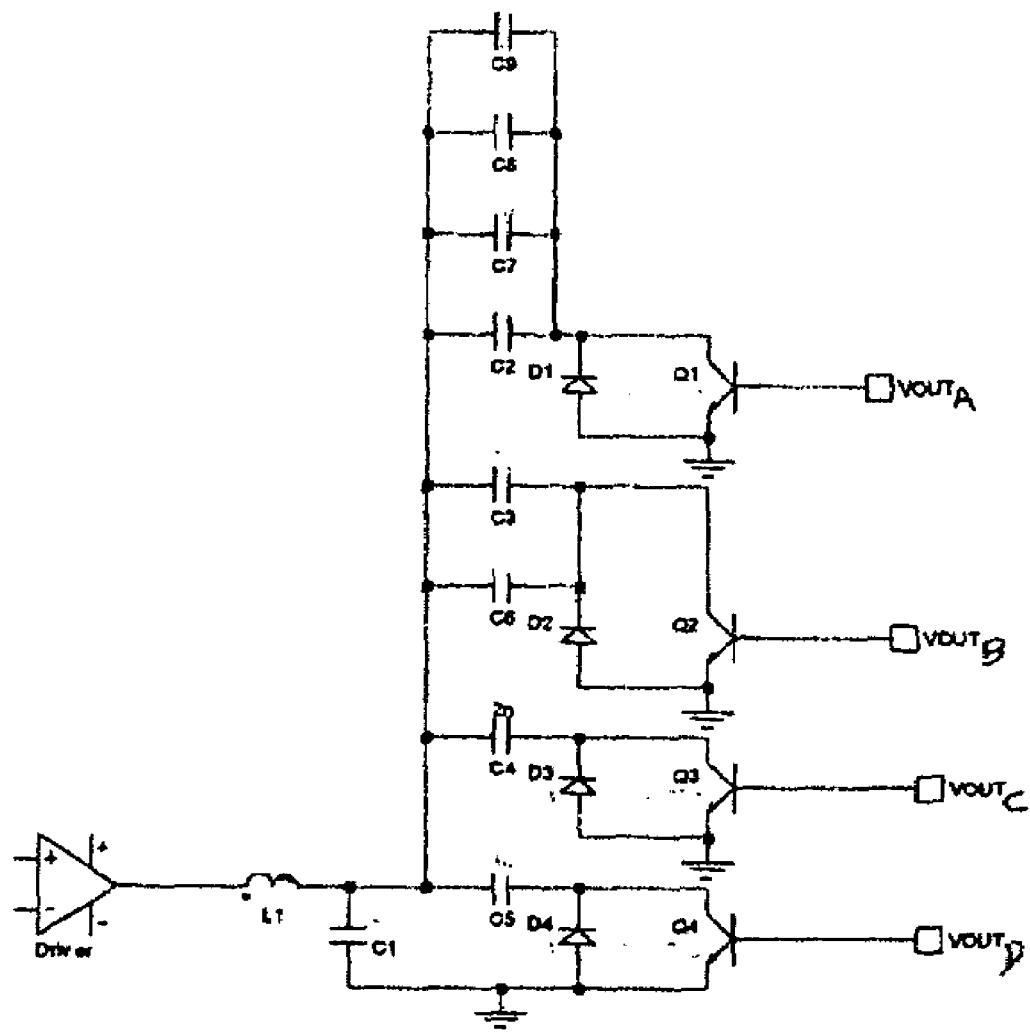
FIG. 13 is a circuit schematic illustrating variable tuning of a drive coil.

FIG. 13 is a circuit schematic illustrating variable tuning of a drive coil. Additional capacitors are switched in or out of the circuit by logic control signals. The capacitors are, by way of example, arranged in a binary manner such that sixteen discrete tuning points are provided by the circuit shown. The pair of windings associated with a simple time varying field may be connected in series such that only a single tuning node is required. The driver may be an analogue amplifier, driven by any waveform having a significant frequency component at the resonant frequency of the tuned circuit, or a digital driver, such as provided by one or more logic gates, driven by any digital signal containing a significant frequency component at the resonant frequency.

A rotating field requires a minimum of two drivers for the two pairs of coils, and two tuning nodes. High Q tuning is problematical since the tuning of one pair of coils will affect the second pair through the mutual inductance existing between the two pairs. Furthermore, an item placed to one side of a charging surface will have a different coupling to each coil, so there is not a single resonant frequency for the array and the rotating field will be elliptical rather than circular. The "free running" state, where no secondary unit 304 is present, can be detected and the power output reduced to a predetermined level or applied periodically to determine whether an item has been placed on the charging surface.

An alternative to varying capacitance is varying the drive coil frequency to maintain resonance when the inductance is altered by the addition of a secondary unit 304. Analog tuning circuits may be utilized to vary the drive coil frequency. In addition, a sense coil near a driven coil could provide a feedback signal to a microcontroller that produces the signal to the driver. Software can provide a process whereby the output frequency is adjusted to maximize the signal from the sense coil. Application of a variable frequency is predicated on the basis that the high efficiency achieved by driving a resonant system is needed for effective operation but that power extraction from the coil in the secondary unit 304 will result in that system having a relatively low Q. The efficiency of reception is therefore not significantly affected by shifts in frequency, particularly if these are minimized by the use of a charger 302 with a permeable charging surface 357, which minimizes the change of inductance seen by the drive coils when a secondary unit 304 is introduced.

One advantage of a variable frequency system is that secondary units create a change in inductance and an associated increase in losses. When a loss increase is too large in relation to the inductance increase, the presence of foreign conductive items is detected and the user is warned that performance is being compromised. When there is no item to be charged the charger runs at the lowest possible frequency. This could be automatically associated with a low-power standby mode, with high power only being provided when the resonant frequency is within a predefined range.

In a further embodiment, the charger 302 may use a high voltage to drive the charger coil directly without resonance. In a preferred embodiment a DC-to-DC converter is used to provide a voltage supply, which may be in the order of a hundred volts. This supply is provided to a high voltage driver, which may be an analog or a digital circuit. The drive is by a digital signal with a pulse width modulated waveform in an embodiment of the invention. The carrier frequency is chosen to be high enough that it does not produce significant current in the coil inductance, and therefore does not produce a field. The modulating waveform is a sine wave at the frequency desired for the field. This system is relatively unaffected by changes in the magnetic environment. This system has the benefit of optimum efficiency in power transfer, minimizing thermal losses, and simplifying thermal management and enhancing reliability in the charger.

The frequency, phase, amplitude, or any combination thereof of the drive voltage may be modulated in such manner as to convey data to the secondary unit 304. In an embodiment of the invention, the charger coils are driven by a voltage waveform comprising a high frequency carrier modulated with a lower frequency such that only the lower frequency produces significant magnetic flux. In one embodiment, the charger coils are driven by a voltage waveform comprising a high frequency square-wave carrier pulse-width modulated with a lower frequency sine wave such that only the lower frequency produces significant magnetic flux.

Adding a third driven coil, lying in the horizontal plane, provides a field that can be steered to provide three dimensional rotation and coverage of any relative orientation between primary and secondary unit coils as described in U.S. Pat. No. 6,134,420, entitled "Vector Measuring Aerial Arrays for Magnetic Induction Communication Systems," which is hereby incorporated by reference. Specifically this would allow optimal coupling to a secondary unit 304 placed such that the receive coil is tilted in the vertical plane. The magnetic field provided by the third driven coil has a substantial vertical component and has the same frequency and phase as one of the substantially horizontal fields, resulting in a rotating magnetic field that can be tilted out of the horizontal plane. The phase of the magnetic field provided by the third driven coil may be alternated between the phases of the substantially horizontal fields.

It is desirable to provide some communication between the charger 302 and secondary units. The frequency, phase, amplitude, or any combination thereof, may be modulated in such manner as to convey data to a secondary unit 304. A communication system allows the charger 302 to identify the number of secondary units placed on the charging surface and to determine the total charge required. The user is then informed if the charging capacity of the system is being exceeded. Additional information can be conveyed through a display unit or via audible signal. The number of secondary units present can be determined from inductance changes in resonant systems. The state of battery charge of a secondary unit 304 can be determined if secondary units with 'fuel gauge' monitoring of battery use send data on remaining capacity and/or operating time. Such data can include the stage in the charge cycle reached and the power being demanded. This is particularly useful for small secondary units such as headsets that can not incorporate a significant visual display. Use of a data link increases accuracy and usefulness. Instantaneous demand on charge power can be determined as well as maximum charging power based on communication between the charger 302 and secondary unit 304.

Resonant systems are amenable to switched-key modulation or phase modulation in the charger 302. The secondary unit 304 may transmit on a specified separate frequency using its receive coil. This signal would be detected by the charger coils, or a separate coil or array of coils, connected to an appropriate receiver. The choice of frequency, modulation and data encoding is an open one.

The non-resonant system is amenable to switched-key modulation and all forms of frequency and phase modulation. The field from the charger 302 constitutes a robust and flexible data link. The communication from the secondary unit 304 is achieved by transmission on the solenoidal coil and reception by the drive coils, or by a dedicated coil or array of coils in the charger 302. The choice of frequency, modulation and data encoding is an open one.

If the secondary unit 304 has a dedicated communication channel as a part of its prime application, such as an infra-red or radio link, the channel might also be used for the return data link from the secondary unit 304 to the charger 302. In an embodiment of the invention, the radio link used may be a Bluetooth link.

The present invention thereby can charge any appropriately equipped secondary unit 304 simply by placement of the device on the charging surface. Further, multiple secondary units can be placed on the charging surface and all will be charged simultaneously. In a specific embodiment of the invention, approximately 10 W of charging power is provided. Charger 302 may replace a number of different chargers, reducing cable clutter and reducing the number of chargers carried by users. In a present embodiment, charger 302 has a charging surface of approximately 148 mm in width and 210 mm in length, the size of an A5 sheet of paper. A charging surface of this size may include two or three recesses for items to be charged. Greater size charging surfaces may be used, but may be limited in practical terms where desk space is restricted.

In summary, the inventive charger 302 described herein offers several advantages. The charger does not require a housing with a compartment that must be mechanically matched to the item being charged. Furthermore, the charger 302 provides a solution that can charge several small electronic devices simultaneously. A feature of the invention utilizes angled charging coils beneath the charging surface to generate a substantially horizontal field across the charging surface. In an embodiment of the invention, the angled charging coils are placed beneath a concave or similarly shaped charging surface.

Because the charging surface is a relatively flat and wide surface, placing a device to be charged on the charging surface requires the simplest and easiest possible action from the user to recharge, such that recharging becomes a transparent operation. This is particularly convenient for devices that are frequently cycled between use and non-use, such as a telephone headset. Every time the user removes the headset and places it on the charging surface, the headset receives a top-up charge, extending the user operating time in practice. Furthermore, the charger doubles as convenient and safe storage for the headset.

The absence of electrical contacts improves both performance and appearance of the rechargeable device. Without contacts, there is no possibility for the contacts to be contaminated. Since the charger may be operated with a variety of dissimilar devices because close mechanical matching is not required, the invention provides a near universal charger. As a result, the charger and associated rechargeable devices can be manufactured more cost-effectively.

One of ordinary skill in the art will recognize that other architectures for the charger may be employed. For example, a variety of charging circuits may be utilized. Furthermore, other shapes and sizes for the charging surface and charger housing may be employed. Having described the invention in terms of a preferred embodiment, it will be recognized by those skilled in the art that various types of components may be substituted for the configuration described above to achieve an equivalent result. It will be apparent to those skilled in the art that modifications and variations of the described embodiments are possible, and that other elements or methods may be used to perform equivalent functions, all of which fall within the true spirit and scope of the invention as measured by the following claims.

The invention claimed is:

1. An apparatus for inductive charging a battery comprising:
    a housing with a lower surface and a charging surface, wherein a rechargeable device with a rechargeable battery may be variably placed on the charging surface;
    a controller for driving an oscillator, wherein the controller receives power from a power source;
    a first charger coil disposed within the housing;
    a second charger coil disposed within the housing, wherein the first charger coil and the second charger coil are coupled to the oscillator and create a substantially horizontal magnetic field in a volume of space above the charging surface; and
    one or more permeable tiles disposed on or below the charging surface and above the first charger coil and the second charger coil, wherein the one or more permeable tiles form a controlled permeable path to limit field leakage from the charging surface.

2. The apparatus of claim 1, wherein the first charger coil and the second charger coil have a core comprising air or a non-permeable material.

3. The apparatus of claim 1, wherein the first charger coil and the second charger coil have a core comprising a permeable material.

4. The apparatus of claim 1, further comprising a permeable material disposed in the housing above the lower surface and below the first charger coil and the second charger coil.

5. The apparatus according to claim 4, wherein the permeable material comprises ferrite.

6. The apparatus according to claim 4, wherein the permeable material is disposed within a non-permeable carrier.

7. The apparatus according to claim 4, wherein the permeable material is ferrite loaded thermoplastic.

8. The apparatus according to claim 4, wherein the permeable material is over-moulded with thermoplastic.

9. The apparatus according to claim 4, wherein the permeable material is integrated with a core permeable material disposed within the first charger coil and the second charger coil.

10. The apparatus of claim 1, wherein the first charger coil ad the second charger coil create a first substantially horizontal magnetic field along a first direction above the charging surface, the apparatus further comprising:
    a third charger coil disposed within the housing; and
    a fourth charger coil disposed within the housing, wherein the third charger coil and fourth charger coil create a second substantially horizontal magnetic field along a second direction above the charging surface, wherein the first direction is orthogonal to the second direction.

11. The apparatus of claim 10, wherein the first substantially horizontal magnetic field and the second substantially horizontal magnetic field have the same frequency and a phase difference of 90 degrees.

12. The apparatus of claim 10, further comprising a fifth charger coil disposed within the housing for creating a substantially vertical magnetic field.

13. The apparatus of claim 12, wherein a substantially vertical magnetic field phase is alternated between a first horizontal magnetic field phase and a second horizontal magnetic field phase.

14. The apparatus of claim 1, further comprising a resonance tuning circuit for operating the first charging coil and the second charging coil in a resonance circuit with one or more rechargeable devices placed on the charging surface.

15. The apparatus of claim 14, wherein the resonance turning circuit comprises a variable capacitance which is adjusted when a rechargeable device is placed on the charging surface.

16. The apparatus or claim 14, wherein the resonance tuning circuit varies the frequency of the first charging coil and the second charging coil when a rechargeable device is placed on the charging surface.

17. The apparatus of claim 1, wherein the charging surface is a concave surface.

18. The apparatus of claim 17, wherein the first charging coil and the second charging coil are disposed adjacent to the concave surface at an inward angle with respect to a vertical axis.

19. The apparatus of claim 1, wherein the charging surface crises a plurality of recessed areas for simultaneous charging of a plurality of rechargeable devices.

20. The apparatus of claim 1, wherein the power source is an electronic device.

21. The apparatus of claim 1, wherein the power source is coupled to the controller via a USB port.

22. The apparatus of claim 1, wherein the first charging coil and the second charging coil receive a drive voltage from the oscillator that is modulated in frequency, phase, amplitude, or any combination thereof to convey data to the rechargeable device.

23. The apparatus of claim 22, wherein a high frequency carrier is modulated with a lower frequency such that only the lower frequency produces significant magnetic flux.

24. The apparatus of claim 23, wherein the high frequency carrier is a square-wave carrier and the lower frequency is a sine wave.

25. The apparatus of claim 1, wherein the oscillator provides an A.C. signal with a frequency between 10 kHz and 40 kHz.

26. A system for inductive charging comprising:
a charger comprising:
a housing with a lower surface and a charging surface, wherein a rechargeable device with a rechargeable battery may be variably placed on the charging surface;
a controller for driving an oscillator, wherein the controller receives power from a power source;
a first charger coil disposed within the housing;
a second charger coil disposed within, the housing, wherein the first charger coil and the second charger coil are coupled to the oscillator and create a substantially horizontal magnetic field in a volume of space above the charging surface; and
one or more permeable tiles disposed on or below the charging surface and above the first charger coil and the second charger coil, wherein the one or more permeable tiles form a controlled permeable path to limit field leakage from the charging surface,
wherein the rechargeable device comprises:
a receive coil for coupling to the substantially horizontal magnetic field and producing an induced voltage; and
a rectifier for producing a rectified induced voltage to charge the battery in the rechargeable device.

27. The system of claim 26, wherein the rectified induced voltage further provides operating power to the rechargeable device.

28. The system of claim 26, wherein the rechargeable device sends data to the charger.

29. The system of claim 28, wherein data is sent with the receive coil.

30. The system of claim 29, wherein the charger receives data with the first charging coil and the second charging coil.

31. The system of claim 29, wherein the charger further comprises a charger receive coil for receiving data from the rechargeable device.

32. The system of claim 28, wherein the rechargeable device sends data to the charger with a radio signal.

33. The system of claim 28, wherein the rechargeable device sends data to the charger with an infrared signal.

34. The system of claim 28, wherein the charger further comprises a USB port and wherein data received from the rechargeable device is transferred to a personal computer through the USB port.

35. The system of claim 26, wherein the receive coil is a solenoidal coil.

36. The apparatus of claim 1, wherein the one or more permeable tiles comprise ferrite.

37. An apparatus for inductive charging a battery comprising:
a housing having a concave charging surface;
a controller for driving an oscillator, wherein the controller receives power from a power source;
a first angled charger coil disposed within the housing adjacent the concave charging surface; and
a second angled charger coil disposed within the housing adjacent the concave charging surface, wherein the first angled charger coil and the second angled charger coil are coupled to the oscillator and crate a substantially horizontal magnetic field in a volume of space above the concave charging surface; and
one or more permeable tiles disposed on or below the concave charging surface and above the fit angled charger coil and the second angled charger coil, wherein the one or more permeable tiles form a controlled permeable path to limit field leakage from the concave charging surface.

38. The apparatus of claim 37, wherein the first angled charger coil and the second angled charger coil have a core comprising a permeable material.

39. The apparatus of claim 38, further comprising a permeable material disposed in the housing below the first angled charger coil and the second angled charger coil.

40. The apparatus of claim 39, wherein the permeable material comprises ferrite.

41. The apparatus of claim 39, wherein the permeable material is disposed within a non-permeable carrier.

42. The apparatus of claim 39, wherein the permeable material is ferrite loaded thermoplastic.

43. The apparatus of claim 39, wherein the permeable material is over-moulded with thermoplastic.

44. The apparatus of claim 39, wherein the permeable material is integrated with a core permeable material disposed within the first angled charger coil and the second angled charger coil.

45. The apparatus of claim 37, wherein the first angled charger coil and the second angled charger coil create a first substantially horizontal magnetic field along a first direction above the concave charging surface, the apparatus further comprising:
a third angled charger coil disposed within the housing; and
a fourth angled charger coil disposed within the housing, wherein the third angled charger coil and fourth angled charger coil create a second substantially horizontal magnetic field along a second direction above the concave charging surface, wherein the first direction is orthogonal to the second direction.

46. The apparatus of claim 45, wherein the first substantially horizontal magnetic field and the second substantially horizontal magnetic field have a same frequency and a phase difference of 90 degrees.

47. The apparatus of claim 45, further comprising a fifth charger coil disposed within the housing for creating a substantially vertical magnetic field.

48. The apparatus of claim 47, wherein a substantially vertical magnetic field phase is alternated between a first horizontal magnetic field phase and a second horizontal magnetic field phase.

49. The apparatus or claim 37, further comprising a resonance turning circuit for operating the first angled charger coil and the second angled charger coil in a resonance circuit with one or more rechargeable devices placed on the concave charging surface.

50. The apparatus of claim 49, wherein the resonance tuning circuit comprises a variable capacitance which is adjusted when a rechargeable device is placed on the concave charging surface.

51. The apparatus of claim 49, wherein the resonance turning circuit varies the frequency of the first angled charging coil and the second angled charging coil when a rechargeable device is placed on the concave charging surface.

52. The apparatus of claim 37, wherein the concave charging surface comprises a plurality of recessed areas for simultaneous charging of a plurality of rechargeable devices.

* * * * *